United States Patent
Ilnicki et al.

(10) Patent No.: US 6,751,677 B1
(45) Date of Patent: Jun. 15, 2004

(54) METHOD AND APPARATUS FOR ALLOWING A SECURE AND TRANSPARENT COMMUNICATION BETWEEN A USER DEVICE AND SERVERS OF A DATA ACCESS NETWORK SYSTEM VIA A FIREWALL AND A GATEWAY

(75) Inventors: Slawomir K. Ilnicki, Los Altos, CA (US); James P. Rice, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/379,755

(22) Filed: Aug. 24, 1999

(51) Int. Cl.[7] .................................................. G06F 9/54
(52) U.S. Cl. .................... 709/316; 709/229; 707/103 R
(58) Field of Search ................................ 709/201, 225, 709/229, 316; 713/155, 201, 152; 707/10, 103 R (56) References Cited

U.S. PATENT DOCUMENTS

| | | | |
|---|---|---|---|
| 5,623,601 A | | 4/1997 | Vu .......................... 395/187.01 |
| 5,781,550 A | | 7/1998 | Templin et al. .............. 370/401 |
| 5,898,830 A | * | 4/1999 | Wesinger, Jr. et al. ...... 713/201 |
| 5,907,621 A | * | 5/1999 | Bachman et al. ........... 713/155 |
| 6,088,796 A | * | 7/2000 | Cianfrocca et al. ......... 713/152 |
| 6,154,775 A | * | 11/2000 | Coss et al. .................. 709/225 |
| 6,161,139 A | * | 12/2000 | Win et al. .................... 709/225 |
| 6,272,492 B1 | * | 8/2001 | Kay ............................. 707/10 |
| 6,324,648 B1 | * | 11/2001 | Grantges, Jr. ............... 713/201 |
| 6,356,930 B2 | * | 3/2002 | Garg ........................... 709/201 |

* cited by examiner

Primary Examiner—N. ElHady
Assistant Examiner—Jungwon Chang (57) ABSTRACT

A method of allowing a secure and transparent communication between a user device and servers of a data access network system via a firewall and a gateway is described. The method includes the step of designating a plurality of ports in the firewall for the gateway, each corresponding to one of a number of ports in the gateway. Each of the gateway ports can be dynamically assigned to correspond to the port of one of the servers. The method also includes a step of proxifying an object reference used in a user request for a target server from the user device in order to establish secure connection between the user device and the target server. This step is first performed by replacing the IP address and the port number of the target server of the user request with a dynamically assigned gateway port and the IP address of the gateway. Then the dynamically assigned gateway port and the gateway's IP address are mapped to the port of and IP address of the target server such that the user request is not required to expose the IP address and port number of the target server at the gateway.

11 Claims, 8 Drawing Sheets

METHOD AND APPARATUS FOR ALLOWING A SECURE AND TRANSPARENT COMMUNICATION BETWEEN A USER DEVICE AND SERVERS OF A DATA ACCESS NETWORK SYSTEM VIA A FIREWALL AND A GATEWAY

BACKGROUND OF THE INVENTION

1. Field of the Invention

The present invention pertains to communication networks. More particularly, this invention relates to providing a secure and transparent network gateway that does not require complex configuration to the associated firewall.

2. Description of the Related Art

Figure 1:
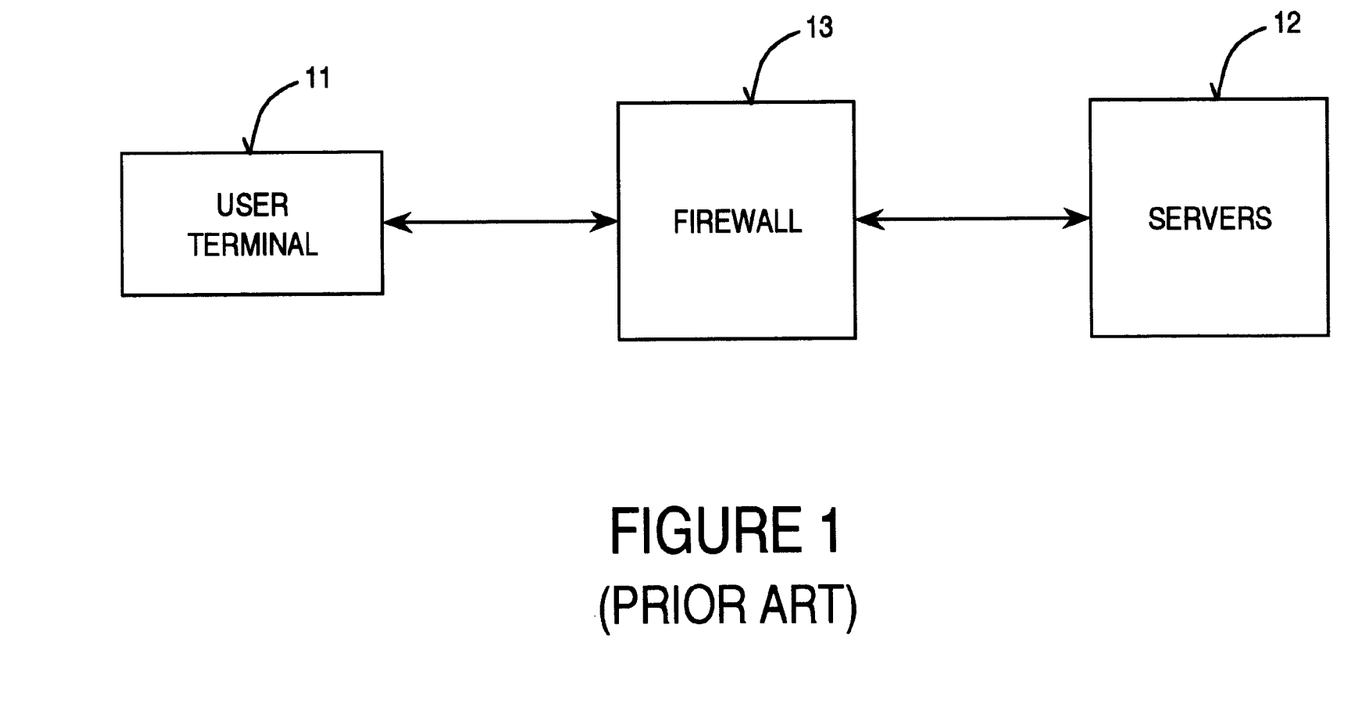
FIG. 1 shows a prior art arrangement of network communication using a firewall.

In an open-ended network system such as Internet, a firewall is typically employed between servers and remote accessing clients (e.g., user terminals). The main purpose of the firewall is to control external accesses to and from the servers. This means that the firewall allows the external accesses to the servers to cross the firewall in a controlled fashion. FIG. 1 shows one such prior art arrangement of the firewall.

In FIG. 1, communication between the user terminal 11 and the target object servers 12 is conducted using Object Request Broker (ORB) transparent protocol over a TCP/IP (Transmission Control Protocol-Internet Protocol) communications protocol. When tie user terminal 11 wants to access a particular object in one of the target object servers 12, the terminal 11 uses an Interoperable Object Reference (IOR) to issue an object invocation using an object reference of the requested object. The object invocation is referred to as the user access request below. The object reference typically includes the TCP/IP port number and IP (Internal Protocol) address of the object. The port number and IP address specify the target object server that contains the requested object.

The firewall 13 has a number of TCP/IP ports and IP addresses, each configured or opened to correspond to one of the servers 12. When the user access request enters the firewall 13, the firewall 13 checks if the port and IP address specified in the user access request are opened in the firewall 13. If the port and IP address are opened in the firewall 13, the request passes through the firewall 13 and reaches the designation target object server. Then a communication channel can be established for transferring the requested object to the user terminal 11. If the firewall 13 does not have the corresponding port opened, the firewall 13 does not let the user access request to pass through it and does not establish communication channel for the user access request.

One disadvantage of this prior art firewall is that the firewall has statically configured target object ports and IP addresses. Adding new target object servers requires reconfiguration of the firewall. This can only be done by opening new ports and IP addresses. For security reasons, these ports and IP addresses cannot be opened ahead of time because it creates security loopholes. This means that the firewall does not have any flexibility.

Figure 2:
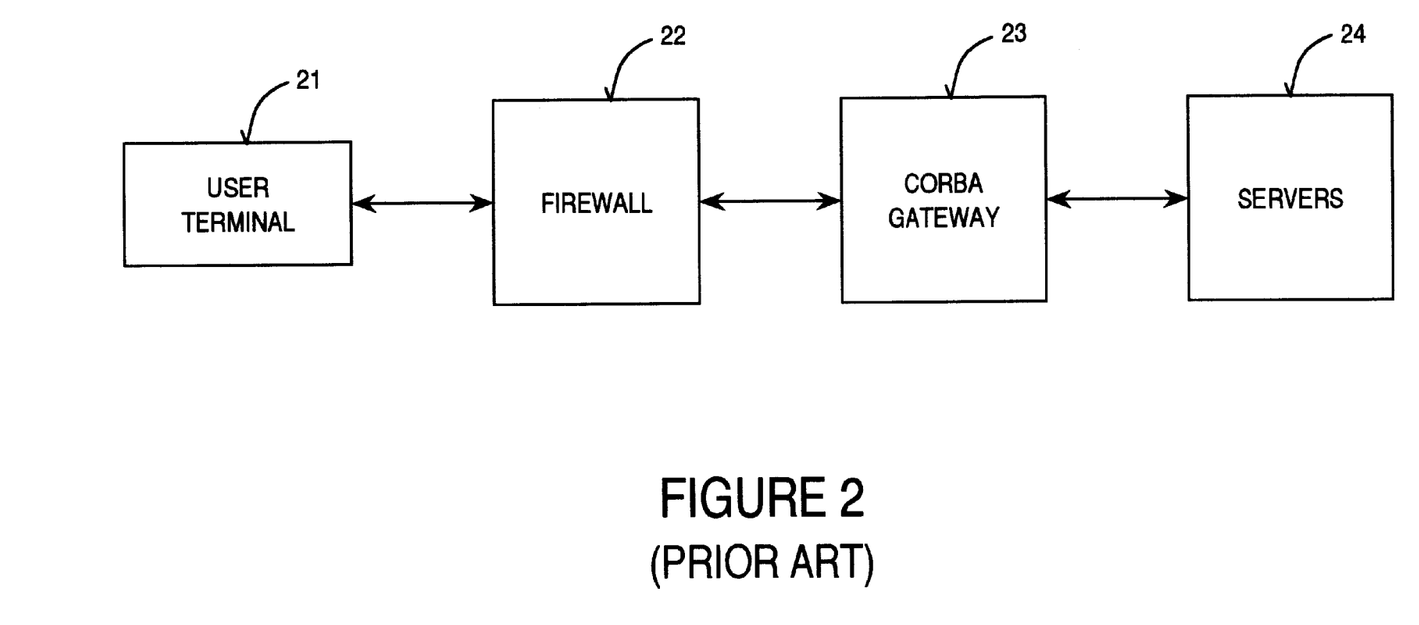
FIG. 2 shows another prior art arrangement of network communication using a firewall and a CORBA gateway.

One prior solution to solving the problem of accessing the target objects is to employ a CORBA (Common Object Request Broker Architecture) gateway behind the firewall, as can be seen from FIG. 2. The CORBA gateway can also be implemented as part of the firewall. One such prior CORBA gateway is the Wonderwall manufactured and sold by Iona Technologies PLC from Ireland.

In FIG. 2, the firewall 22 is configured to have one port number and IP address designated to the CORBA gateway 23. All user access requests to the servers 24 are forwarded to the CORBA gateway 23 by the firewall 22. The CORBA gateway 23 maps all of the servers 24. Each of the target object servers 24 has an individual IP address and at least one port number. The CORBA gateway 23 includes a mapping lookup table that specifies the port numbers and IP addresses of all the servers 24 connected to the CORBA gateway 23. Each pair of port number and IP address stored in the mapping lookup table of the CORBA gateway 23 can be retrieved from the lookup table using an object key. The object key is part of the object reference from the user access request. Whenever a user access request passes through the gateway 23, the request has to be examined and routed by the gateway 23 according to the content of the object key in the user access request.

In order for a user access request to access a particular target object server, the object reference of the access request is first proxified at the user terminal (e.g., terminal 21) using the IOR such that the proxified request points to the CORBA gateway 23, instead of the intended target object server. The proxification is done by specifically replacing the port number and IP address of the object reference used by the user access request that point to the particular target object server with the port number and IP address of the CORBA gateway 23. To access the target object server, a TCP/IP connection between the user terminal (e.g., the terminal 21) and the gateway 23 must first be established. This is done through the ORB protocol in the user terminal 21 upon receiving the object reference from the client application. In this case, the firewall 22 must have the IP address and port configured in order for the TCP/IP connection to go through. Once the TCP/IP connection is established, the ORB protocol in the user terminal 21 sends the request that contains the object key in the request header.

At the CORBA gateway 23, the server port number and IP address are extracted from the request header by using the object key of the access request to search the mapping lookup table in the CORBA gateway 23. The CORBA gateway 23 establishes another connection (i.e., gateway-target object server) and forwards the request over this connection to the target object server. This dynamically maps the port number and IP address of a particular target object server to the CORBA gateway 23.

However, disadvantages are associated with the prior CORBA gateway. One disadvantage associated is that the gateway typically does not allow the firewall to provide end-to-end security for the communication (e.g., authentication, confidentiality, and integrity). This means that SSL (secure socket layer) protocol cannot be used, for example, between the firewall 22 and the servers 24 as a single session. This is due to the fact that the CORBA gateway requires access to request header in order to extract the object key. Connections have to be terminated at the firewall/gateway and encrypted data have to be decrypted to allow examination of the object reference headers and to make filtering decisions. If SSL is used, secure communication can only establishes two separate sessions. One of which is between the user terminal and the firewall and the other is between the firewall and the target object servers. This means that a single SSL session cannot be established between the user terminal and the target object servers. As a consequence, encryption of data cannot be preserved from end-to-end. There is no direct authentication between the user terminal and the target object servers. The gateway has to be trusted to pass client and target object server credentials (e.g., identity certificate). However, this credential must be passed as additional payload. This means that the target object server must be modified to manage user credentials.

Another disadvantage is that the configuration of access control list based on object keys of the prior CORBA gateway is static, complex, and manual. Moreover, the prior CORBA gateway does not provide a mechanism for authenticating clients and target object servers at the firewall. Depending on security policy, the client authentication may be necessary at the firewall before commencing traffic to the target object servers. This protection is necessary for malicious outside attacks and the firewall creates a first line of defense. Authenticating target object servers at the firewall may be necessary in situations where security policy requires that an authorized resource is available at the target address, not a Trojan horse. A client or user terminal may use a Trojan horse to penetrate Internet network.

SUMMARY OF THE INVENTION

One feature of the present invention is to provide a secure and transparent network connection for an open-ended network system.

Another feature of the present invention is to provide a secure and transparent network gateway that does not require complex configuration to the associated firewall.

A further feature of the present invention is to provide a secure and transparent network gateway that simplifies the proxification of Interoperable Object References (IORs) and does not expose dynamically assigned ports of the gateway to external client applications.

A still further feature of the present invention is to provide a secure and transparent network gateway that maps a dynamically assigned gateway port to specific destination IP and port at the servers.

A method of allowing a secure and transparent communication between a user device and servers of a data access network system via a firewall and a gateway is described. The method includes the step of designating a plurality of ports in the firewall for the gateway, each corresponding to one of a number of ports in the gateway. Each of the gateway ports can be dynamically assigned to correspond to the port and IP address of one of the servers. The method also includes a step of proxifying an object reference that refers to a target server of the servers to be accessed by a user request from the user device in order to allow a single end-to-end secure session between the user device and the target server to be established via the gateway. This step is performed by first replacing the IP address and the port number of the target server of the user request with a dynamically assigned gateway port and the IP address of the gateway. Then the dynamically assigned gateway port and the gateway's IP address are mapped to the port of and IP address of the target server such that the user request is not required to expose the IP address and port number of the target server and the single end-to-end secure session between the user device and the target server is established.

In a data access network system having servers, a client access device, a firewall, and a first and a second gateway serially coupled between the servers and the firewall, a method of establishing secure connection between the client device and a target server of the servers is described. The method includes the step of designating a plurality of ports in the firewall for the first gateway, each corresponding to one of a number of ports in the first gateway. Each of the gateway ports of the first gateway can be dynamically assigned to correspond to a port of the second gateway. Each of the gateway ports of the second gateway can also be dynamically assigned to correspond to a port of the servers. The method also includes a step of proxifying an object reference that refers to the target server to be accessed by a user object invocation request from the user device in order to establish a single end-to-end secure session between the user device and the target server. This step is performed by (1) replacing the IP address and the port number of the target server within the object reference with a dynamically assigned gateway port and the IP address of the first gateway, (2) mapping the dynamically assigned gateway port and the first gateway's address to a dynamically assigned gateway port and the IP address of the second gateway, and (3) mapping the dynamically assigned gateway port and the IP address of the second gateway to the port and IP address of the target server such that the user request is not required to carry the IP address and port number of the target server. Once the object reference is proxified and proper mapping at the gateway is established, the user then may issue an object invocation request using the proxified object reference. When the user transmits the object invocation request by the client application in the user terminal, a chain of TCP/IP connections (i.e., user terminal-gateway, gateway-gateway, gateway-object) is established from the user terminal. Once such chain of TCP/IP connections is established, the underlying client application in the user terminal establishes over these connections a single SSL session with the target object server. After the SSL connection is established, the user's object invocation request is sent.

Other features and advantages of the present invention will become apparent from the following detailed description, taken in conjunction with the accompanying drawings, illustrating by way of examples the principles of the invention.

DETAILED DESCRIPTION OF THE INVENTION

Figure 3:
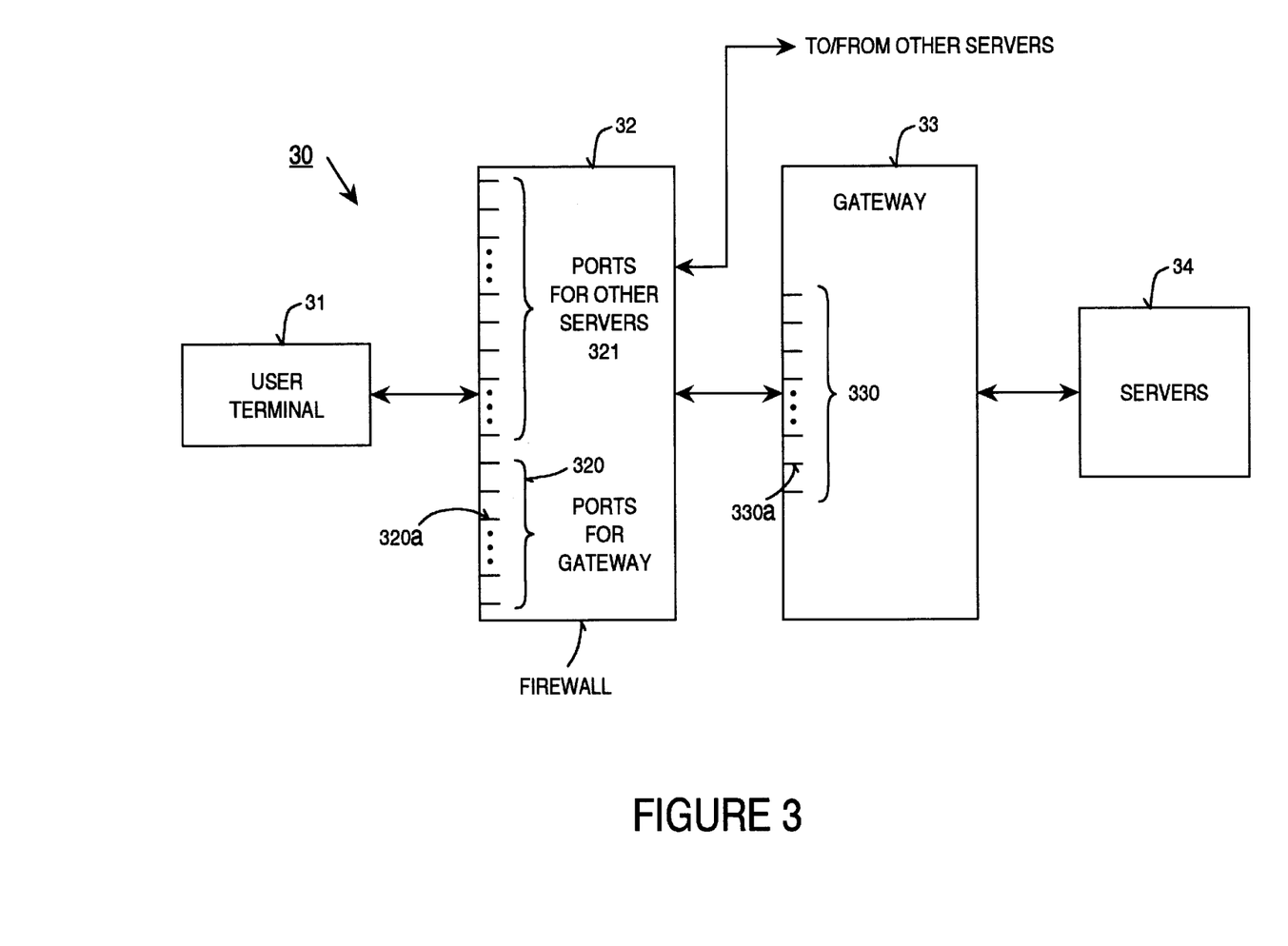
FIG. 3 shows a network communication arrangement in accordance with one embodiment of the present invention.

FIG. 3 shows a data access network system 30 that implements an arrangement for establishing secure connection between a user terminal 31 and target object servers 34 in accordance with one embodiment of the present invention. As can be seen from FIG. 3, the data access network system 30 includes the user terminal 31, a firewall 32, a gateway 33, and the target object servers 34. In accordance with one embodiment of the present invention, the firewall 32 and the gateway 33 are configured to allow a secure and transparent connection between the user terminal 31 and the servers 34 without requiring the user request from the user terminal 31 to expose the IP (Internet Protocol) address and port number of the target server to the gateway 33 once the mapping is established (i.e., once the proxification is made).

As will be described in more detail below, the firewall 32 is configured to designate or reserve a number of its ports (i.e., the ports 320) for the gateway 33. Each of the designated ports 320 corresponds to one of a number of ports (i.e., the ports 330) in the gateway 33. This means that if one of the designated ports 320 of the firewall is opened, the gateway 33 is listening on the corresponding gateway port. Each of the gateway ports 330 of the gateway 33 can be dynamically assigned to correspond to the port and IP address of one of the target object servers 34.

Before establishing the secure connection between the user device 31 and one of the servers 34 specified by a user object invocation request from the user device 31 via the firewall 32 and the gateway 33, the user or client application in the user terminal 31 needs to proxify the object reference used by the user object invocation request to access the requested object in the target object server of the servers 34 at the gateway 33. This means that the IP address and port number of the target server specified in object reference of the user object invocation request are replaced with a dynamically assigned gateway port of the gateway 33 and the IP address of the gateway 33. That dynamically assigned gateway port from the ports 330 is then mapped to the port and the IP address of target object server of the servers 34. The gateway 33 keeps the mapping between (1) the original IP address and the port number of the target server and (2) the dynamically assigned gateway port of the gateway 33 and the gateway's IP address. The mapping and dynamical assignment are done by a gateway proxification object program (not shown in FIG. 3) in the gateway 33 that will be described in more detail below.

This arrangement allows the gateway 33 to automatically map a user object invocation request to the IP address and port number of the target server without requiring the user object invocation request to expose the IP address and port number of the target server at the gateway 33. This in turn allows secure connection to be established between the user terminal 31 and the target server of the servers 34 because the mapping is done without requiring the gateway to examine or look at the encrypted payload of the user request.

This allows the user object invocation request to be carried over a SSL (Secure Socket Layer) protocol, thus providing end-to-end security (e.g., authentication, confidentiality, and integrity). When the SSL protocol is used, the user terminal 31 and the requested target server are directly mutually authenticated. The confidentiality and integrity is provided from the user terminal 31 to the target server via a single SSL session. This means that the gateway 33 does not need to access the user object invocation request to perform routing as the dynamically assigned port has been mapped to the IP address and port of the target object server. It also means that data can be encrypted end-to-end (i.e., from the user terminal 31 to the target object server).

In addition, the proxification of the object reference used by the user request is also simplified and does not expose the dynamically assigned port of the gateway 33 to external client applications (e.g., the user terminal 31). It provides simple access control to the target object server so that only traffic for authorized IP addresses and ports are passed through the gateway 33. Depending on the firewall model and IP address, ports can be dynamically opened and closed by authorized callers. The present invention will be described in more detail below, also in conjunction with FIGS. 3 through 7.

Referring to FIG. 3, the data access network system 30 is an open-end, distributed access system. In one embodiment, the data access network system 30 is an Internet network system. In another embodiment, the data access network system 30 is an Intranet network system.

Referring to FIG. 3, the target object servers 34 include a number of object servers, each hosting a number of content sites for customers. The customers are the owners of the hosted content in the target object servers 34, and thus can be referred to as content providers. The content hosted by the servers 34 can be accessed by external clients (e.g., the user terminal 31). The external clients access the servers 34 using the IP addresses and port numbers of the servers 34. This means that each of the servers 34 has an IP address and a port number.

The external clients can be external user terminals (e.g., the user terminal 31), or accessing servers (not shown). FIG. 3 only shows one external client in the form of user terminal 31 for illustration purposes only. In practice, many more external clients can be connected to the firewall 32. The user terminal 31 can be a computer system or other type of data access and/or processing system. For example, the user terminal 31 can be a personal computer, a notebook computer, a server computer, a workstation computer, a notepad computer, etc.

The firewall 32 is used in the data access network system 30 to control external access (e.g., from the user terminal 31) to the target object servers 34 and/or other data service systems (e.g., e-mail servers) of the data access network system 30. The firewall 32 can be implemented using known firewall technologies. The structure and function of the firewall 32 are well known and thus will not be described in more detail below, except for the portions that relate to the arrangement of the present invention.

The firewall 32 includes a number of ports (i.e., the ports 320 and 321). In accordance with one embodiment of the present invention, the ports 320 are reserved or designated for the gateway 33 while the other ports 330 are reserved for other servers such as e-mail systems, HTTP servers, telephone message centers, etc.

The gateway 33 is connected to the firewall 32. The gateway 33 is used to route data to and from the servers 34. The gateway 33 can be implemented using known gateway technologies. The gateway 33 includes a number of ports 330. Each of the gateway ports 330 corresponds to one of the ports 320 of the firewall 32. For example, the port 320a of the firewall 32 corresponds to the port 330a in the gateway 33. This means that if one of the ports 320 (e.g., the port 320a) is opened for or to receive a user request, its corresponding gateway port (e.g., the port 330a) is also open.

Figure 4:
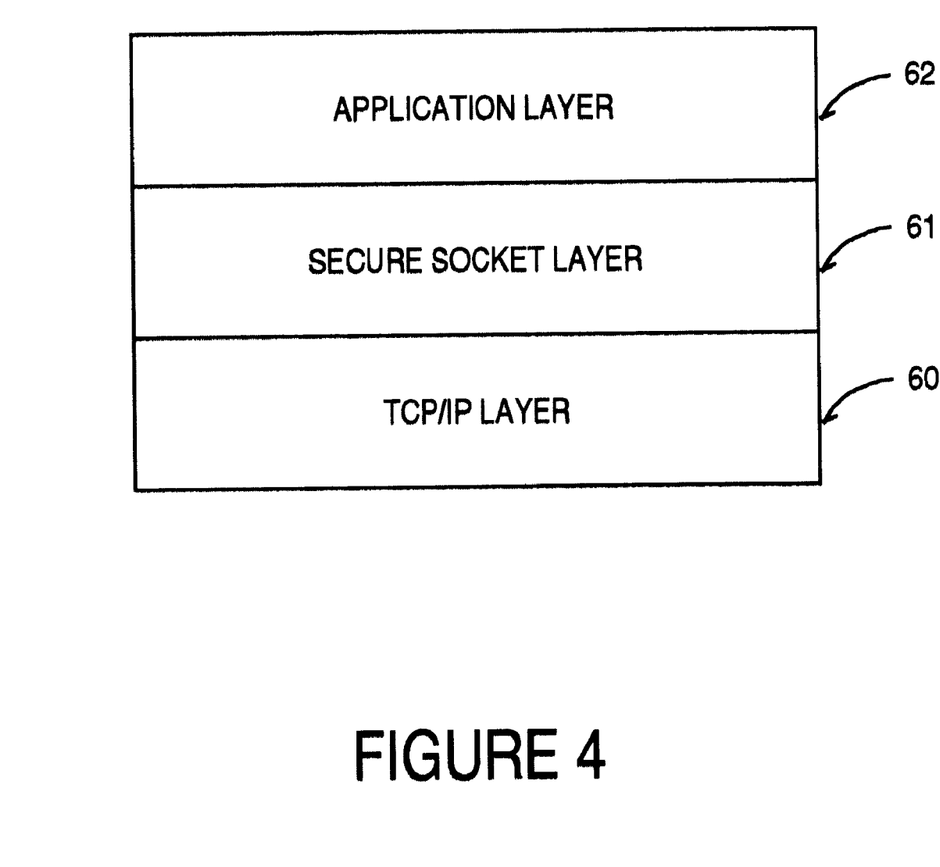
FIG. 4 shows various application layers within the user terminal and the gateway of FIG. 3.

As can be seen from FIGS. 3 and 4, the user terminal 31, the gateway 33, and each of the servers 34 use the TCP/IP communication protocol for data communication. Each of the user terminal 31 and the gateway 33 employs the communication protocol layers 60 through 62, as shown in FIG. 4. The IP and TCP are collectively shown in FIG. 4 as the TCP/IP layer 60. Above that layer is the SSL (secure socket layer) layer. The SSL layer 61 is used to encrypt data for secure communication purposes.

Above the SSL layer 61 is the application layer 62. In one embodiment, the application layer 62 employs CORBA type of application. In another embodiment, the application layer 62 employs the COM (Common Object Model) type of application made available by Microsoft Corporation of Redmond, Wash. The application layer 62 is used to perform external proxification to the user request and conduct communication between the user terminal 31 and the target server.

Referring now to FIG. 3, each of the gateway ports 330 of the gateway 33 can be dynamically assigned to correspond to one of the servers 34. When a gateway port of the gateway 33 is dynamically assigned for one of the servers 34, that dynamically assigned port is mapped to the port number of the target server of the servers 34. In addition, the IP address of the gateway 33 is mapped to the IP address of the target server of the servers 34. The mapping is kept or cached in the gateway 33 such that when the proxified and returned user request is sent from the user terminal 31 to the gateway 33 to access the target server of the servers 34, the gateway 33 does not need to examine the header of the user object invocation request to obtain the port number and IP address information of the target server from the proxified user request. Instead, the gateway 33 automatically maps the dynamically assigned port to the port and IP address of the target server of the servers 34. This allows the gateway 33 to automatically map a user request to the IP address and port of the target server without requiring the user request to expose the IP address and port number of the target server. This in turn allows secure connection to be established between the user terminal 31 and the target server of the servers 34 because the mapping is done without requiring the user request to contain information of the IP address and port number of the target server. This also allows the user object invocation request to be transmitted via the SSL (i.e., the SSL 61), thus providing end-to-end security (e.g., authentication, confidentiality, and integrity). It also means that data can be encrypted end-to-end (i.e., from the user terminal 31 to the target object server).

In addition, the proxification of the object reference is also simplified and does not expose the dynamically assigned port of the gateway 33 to external client applications (e.g., the user terminal 31). It provides simple access control to the target object server so that only traffic for authorized IP addresses and ports are passed through the gateway 33. Ports can be dynamically opened and closed by authorized callers. This also allows the gateway 33 to be transparent to the external clients (e.g., the user terminal 31).

During operation, each of the servers 34 publishes or advertises its IP address and port number in the form of an IOR (Interoperable Object Reference) to external clients. When the user terminal 31 needs to access one of the servers 34, it first proxifies the IOR and then uses the proxified IOR to issue a user object invocation request to access the target server at the specified IP address and port number. The proxification of the IOR means that the IP address and port number of the target server in the IOR need to be replaced with a dynamically assigned gateway port of the gateway 33 and the IP address of the gateway 33. This is done by having the user terminal 31 accessing a gateway proxification object program in the gateway 33. The following is the gateway proxification object program in the gateway 33 that performs proxification.

interface LocalObjectGateway {
  //proxify an IOR
  Object proxify (in Object ref)
  throws NotAuthorized, PortNotMapped;
  }
  interface RemoteObjectGateway {
  // add access to a new service, returning proxy port
  int mapPort (in int IP, in int port)
  throws NotAuthorized, InvalidAddress;
  // remove access to a service
  void unmapPort (in int IP, in int port)
  throws NotAuthorized, PortNotMapped;
  // look up a mapping, returning proxy port
  int resolve (in int IP, in int port)
  throws NotAuthorized, PortNotMapped;
  }.

Figure 5:
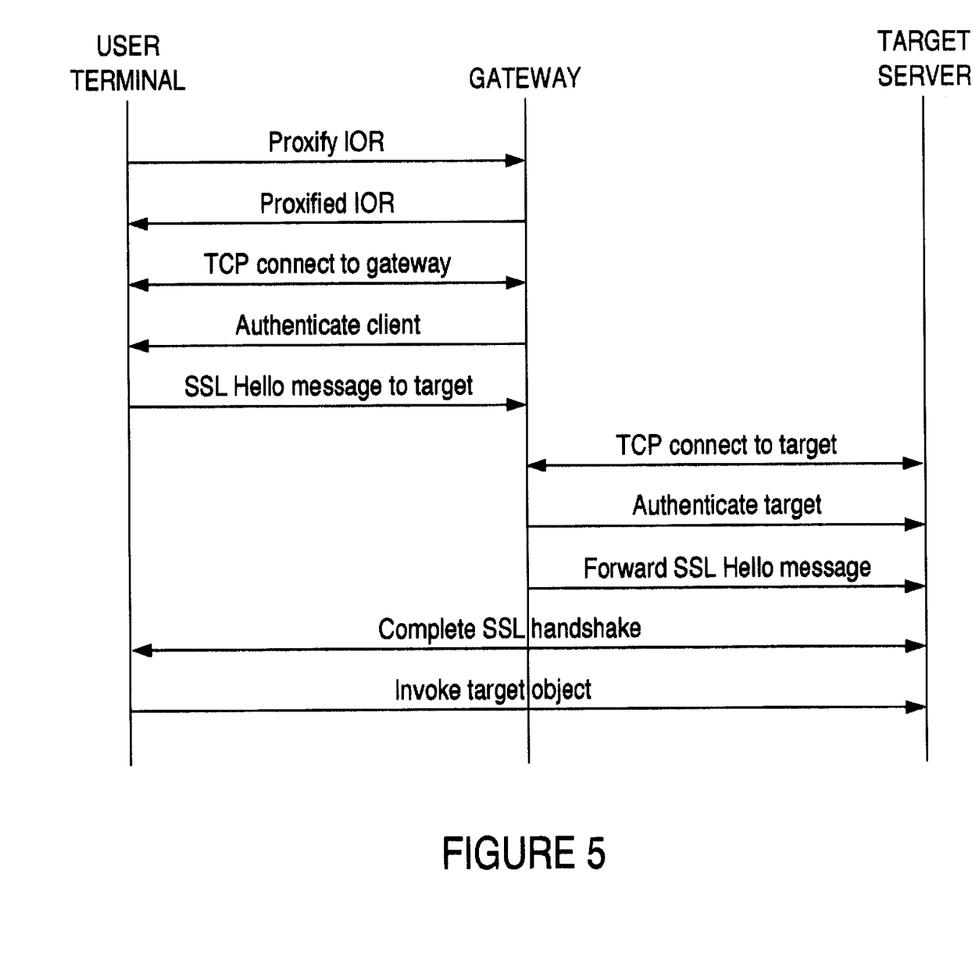
FIG. 5 shows how a secure SSL connection between the user terminal and the target server is established in the arrangement of FIG. 3.

FIG. 5 shows the entire process of proxification and secure communication using the proxified IOR. As can be seen from FIGS. 3–5, the proxification starts when the user terminal 31 sends the IOR proxification request with unproxified IOR to the gateway 33. The proxification request is communicated via the firewall 32 to the gateway 33 at the TCP/IP layer.

When the firewall 32 receives the IOR proxification request, the firewall 32 communicates the request to the gateway 33 so that the gateway proxification object program in the gateway 33 dynamically assigns a port for the port of the target server contained in the IOR. Once the dynamically assigned port of the gateway 33 is determined, its corresponding port at the firewall 32 is also determined. In addition, the dynamically assigned port of the gateway 33 and the IP address of the gateway 33 are mapped to the port and IP address of the target server of the servers 34. Meanwhile, the port number of the target server contained in the unproxified IOR is replaced with the dynamically assigned gateway port and the IP address of the target server contained in the unproxified IOR is replaced with the IP address of the gateway 33. This completes the proxification.

Once the IOR is proxified, the gateway 33 sends the proxified IOR back to the user terminal 31. The user terminal 31 then uses the proxified IOR to issue a user object invocation request to access the target server of the servers 34. When this occurs, a TCP/IP connection is established between the user terminal 31 and the gateway 33. The gateway 33 may authenticate the user request using out-of-band channel. For example, the gateway 33 could invoke the CORBA application in the application layer 62 in the user terminal 31. The IOR of the authentication object contained in the user terminal 31 could be configured dynamically when the proxification in the gateway 33 was made. The gateway 33 uses the IP address from the incoming connection to locate the proper IOR in the user terminal 31 for authentication. After that, the user terminal 31 invokes the SSL layer 61 that sends the SSL "Hello" message for the target server to the gateway 33 to establish a SSL session (see FIG. 5).

Because the dynamically assigned gateway port of the gateway 33 and the IP address of the gateway 33 are mapped to the port and IP address of the target server of the servers 34, the gateway 33 then establishes a connection with the target server to authenticate the target server (see FIG. 5). If the target server is not authenticated, the gateway 33 may try to establish a SSL session with the target server using a separate TCP/IP connection. The application layer 62 of the user terminal 31, however, is not aware of how the connection to the target server is established. The SSL "Hello" message is then forwarded to the target server to start a SSL session.

After a TCP/IP connection is established with the target server via gateway 33, the application layer 62 of the user terminal 31 can send data through this connection. For example, the initial data sent through the gateway 33 is an SSL handshake. The gateway 33 will not pass this data until the entire path to the target server is established (see FIG. 5). The gateway 33 is not aware of the type of data flowing through it. Therefore, the gateway 33 will allow an end-to-end SSL session between the user terminal 31 and the target server of the servers 34 to be established. Once connections are established (i.e., client-gateway and gateway-target server), the target server of the servers 34 can authenticate an SSL client just as if there were a direct connection. A single SSL session is established between the client (e.g., the user terminal 31) and the target (i.e.,the target server of the servers 34). Because the gateway 33 transfers data unaltered, the SSL layer 61 at the client is not aware that the gateway 33 is relaying the traffic. SSL layer 61 is not sensitive to the ports and IP addresses.

Figure 6:
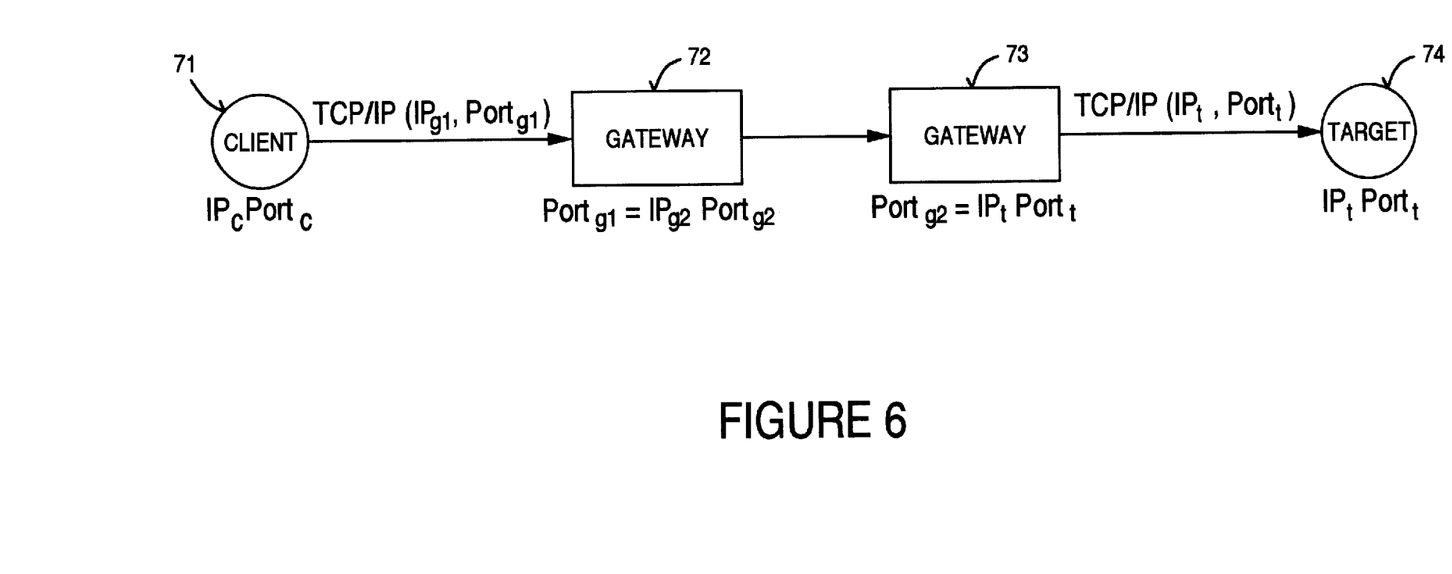
FIGS. 6 and 7 show two other arrangement of the present invention.

FIG. 6 shows another arrangement in accordance with another embodiment of the present invention. As can be seen from FIG. 6, the two gateways (i.e., 72 and 73) are used between the client 71 and the target server 74. The target server 74 has an IP address $IP_t$ and a port number $Port_t$. The client 71 has an IP address $IP_C$ and a port number $Port_C$. In this case, each gateway maps to the next gateway in the chain, determining the IP address and port the next gateway from the ultimate target address. This is transparent to the client 71, which only needs to locate the first gateway (i.e., 72). An intermediate gateway can postpone the actual connection to the next gateway until the actual object invocation. This means until the client passes data through the gateways.

Figure 7:
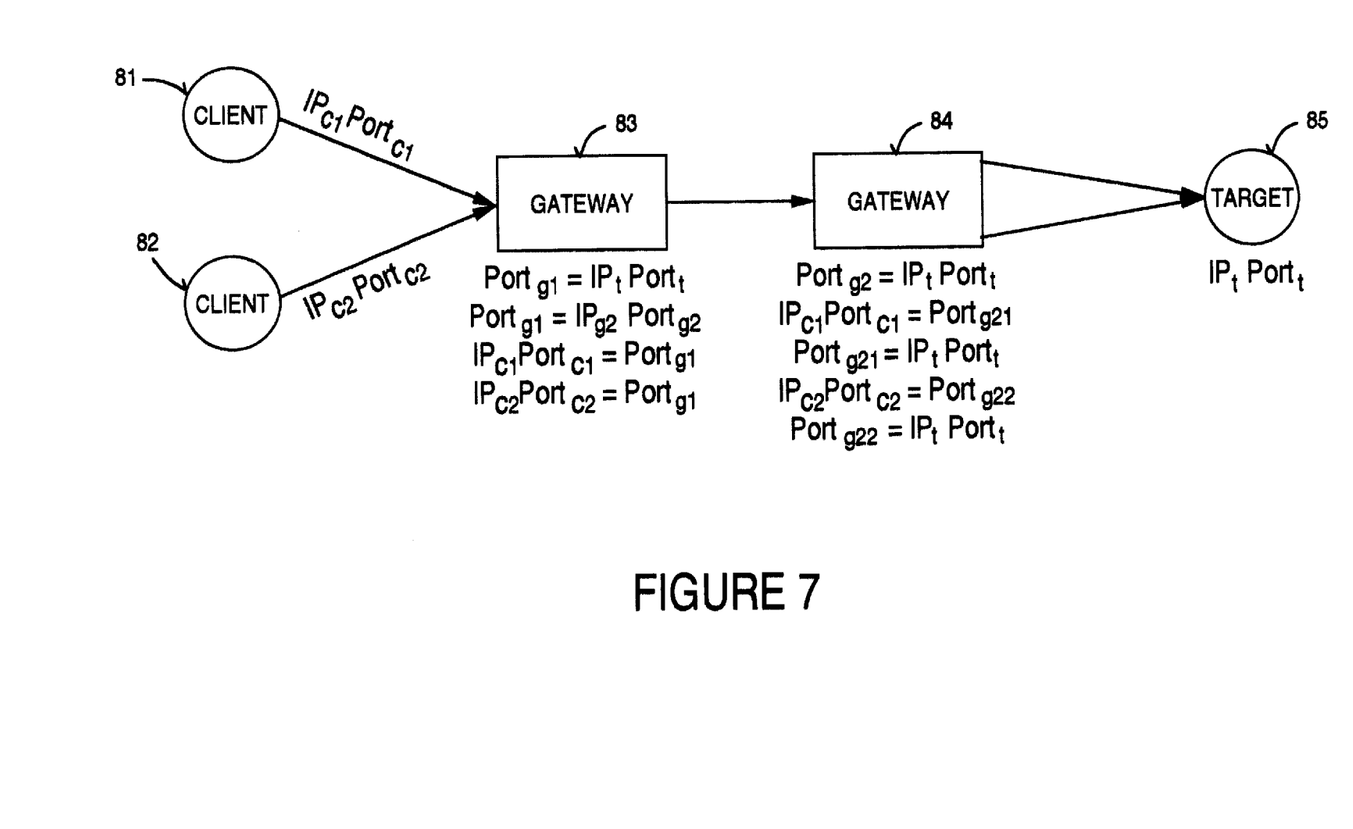

The above described one gateway approach in accordance with one embodiment of the present invention requires that at least one port to be assigned at the gateway 33 per target server. The number of TCP/IP connection is at least twice the number of the connections between clients and target servers. However, between two gateways, a single TCP/IP connection could be sufficient because it could multiplex traffic. In order to multiplex traffic, a gateway passes additional header information including the IP addresses and port numbers of the client and target server. This arrangement is shown in FIG. 7. As can be seen from FIG. 7, two clients are accessing the same target server via multiple gateways. In this case, each of the gateways (i.e., 8384) must maintain appropriate mappings to ensure correct routing from client to target and from target to client. There is only one TCP/IP connection between the gateways. The gateway 84 must maintain two TCP/IP connections, each representing a specific client. The notation for each gateway represents how IP addresses and ports are mapped. For example, for the gateway 83 mapping, $Port_{g1}=IP_tPort_t$ means that the $Port_{g1}$ of the gateway 83 is designated for the target server 85. $Port_{g1}=IP_{g2}Port_{g2}$ means that for the client traffic on the $Port_{g1}$, the next "hop" is the gateway 84. $IP_{C1}Port_{C1}=Port_{g1}$ means that target traffic is directed to $Port_{g1}$ and specific connection with the client 81.

This mapping allows traffic to travers from client to target and be multiplexed between the gateways. When traversing, the protocol between the gateways 83–84 must specify the originator of the connection. The intermediate gateways (e.g., the gateway 83) have to keep information regarding the originator of the connection. For example, if the originator of the TCP/IP connection was the client 81, then all intermediate nodes must contain necessary information (i.e., IP address and port number of the client 81) to route, multiplex, and demultiplex traffic.

Figure 8:
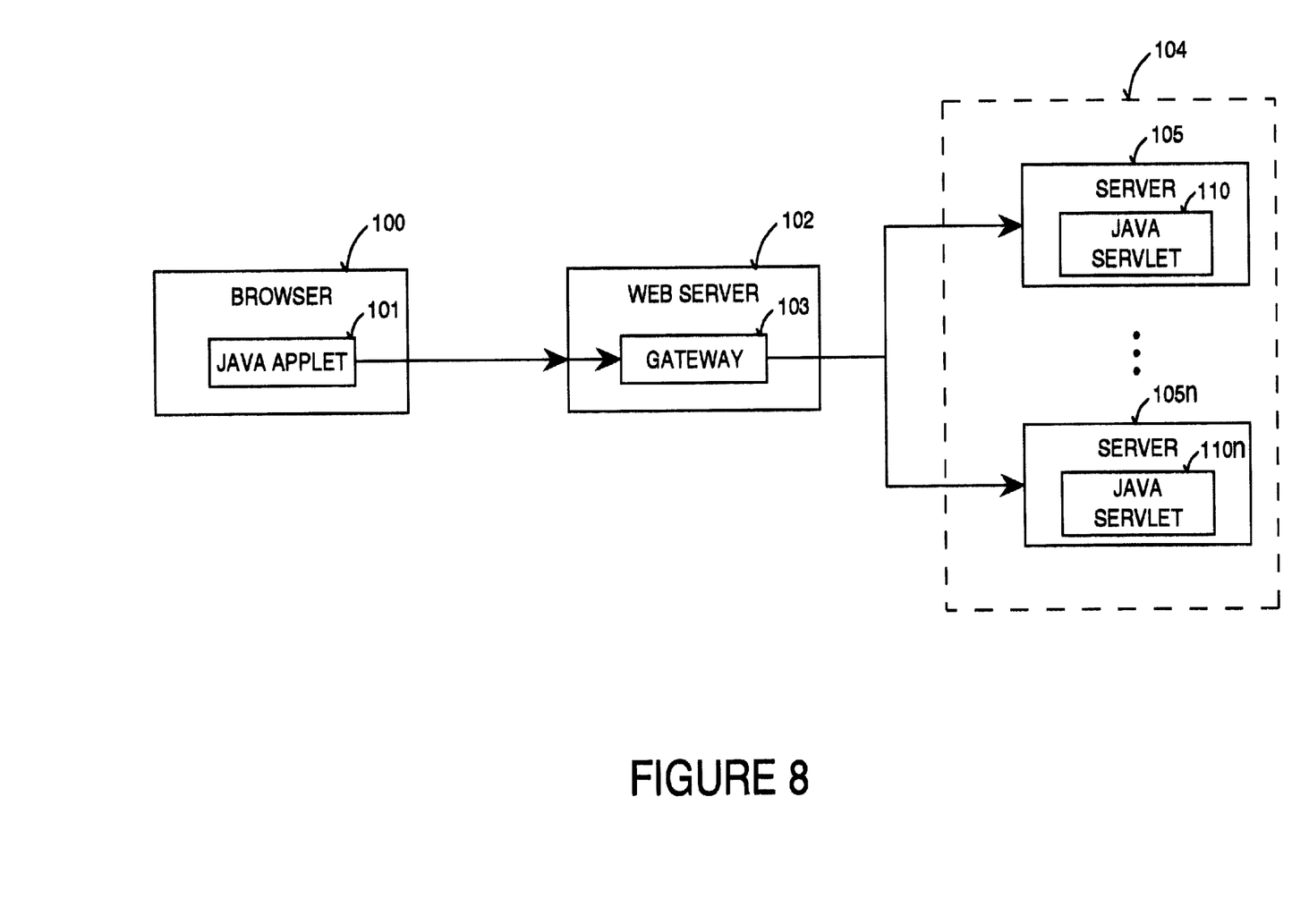
FIG. 8 shows another application of the present invention.

FIG. 8 shows another application of the present invention as shown in FIG. 3. As can.be seen from FIG. 8, the gateway 103 is inside a web server 102 that is between a browser 100 and a number of servers 105–105n. The browser 100 contains a Java applet 101 and the servers 105–105n contain corresponding Java servlets. The gateway 103 is used to connect the Java applet 101 to the servlets in the servers 105–105n. Implementation of Java 1.0 and 1.1 puts restriction on the Java applet 101 such that it could only connect with a web server (e.g., the web server 102). By putting the transparent gateway 103 within the web server 102 and establishing a proper mapping at the gateway 103 using a method similar to the CORBA proxification mechanism described above, it becomes possible to connect Java servlets in other servers (other than web servers) to the Java applet transparently behind the web server 102. Although Java does not use the CORBA proxification mechanism, the web browser 100 and the Java applet 101 need to send explicit request to the gateway 103, indicating as parameters the Java servlet's IP address and port the Java applet 101 would like to map. In exchange, the gateway 103 will return assigned gateway's IP address and port that is mapped to the servlet's IP address and port.

The transparent gateway 103 helps to get around the Java restriction in controlled fashion. The restriction imposed on Java 1.0 and 1.1 is referred to as "sandbox". The idea behind the "sandbox" restriction is to restrict Java applet to communicate only with the web server. As a consequence of that, the Java servlets must run on web servers. The arrangement shown in FIG. 8 does not violate the "sandbox" restriction, but only extends its meaning by calling Java servlets to be deployed at different servers as a form of distributed web server concept. This provides greater flexibility to deploy Java.

In the foregoing specification, the invention has been described with reference to specific embodiments thereof It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A method of allowing a secure and transparent communication between a user device and servers of a data access network system via a firewall and a gateway, comprising:
   (A) designating a plurality of ports in the firewall for the gateway, each corresponding to one of a number of ports in the gateway, wherein each of the gateway ports can be dynamically assigned to correspond to the port of one of the servers;
   (B) proxifying an object reference referring to a target server of the servers which is to be accessed by a user request by
      replacing the IP address and the port number of the target server in the object reference with a dynamically assigned gateway port and the IP address of the gateway;
      mapping the dynamically assigned gateway port and the gateway IP address to the port and IP address of the target server; and
      sending the proxified object reference back to the user device such that the user device uses it to issue the user request to access the target server via the gateway in order to allow secure connection between the user device and the target server to be established without requiring the user request to expose the IP address and port of the target server at the gateway.

2. The method of claim 1, wherein (B) is performed by a proxification object program in the gateway.

3. The method of claim 1, wherein (B) further comprises caching, in the gateway, the mapping of (1) the dynamically assigned gateway port and the IP address of the gateway and (2) the port number and IP address of the target server such that when the dynamically assigned port is opened, the port of the target server is also opened.

4. The method of claim 1, wherein said user device comprises a computer.

5. The method of claim 1, wherein (B) further comprises:

establishing a chain of TCP/IP connections between the user device and the gateway and between the gateway and the target server; and establishing a single SSL (Secure Socket Layer) connection between the user device and the target server.

6. In a data access network system having servers, a client access device, a firewall, and a first and a second gateway serially coupled between the servers and the firewall, a method of allowing secure connection between the client device and a target server of the servers via the gateways to be established, comprising:

(A) designating a plurality of ports in the firewall for the first gateway, each corresponding to one of a number of ports in the first gateway, wherein each of the gateway ports of the first gateway can be dynamically assigned to correspond to a port of the second gateway, wherein each of the gateway ports of the second gateway can also be dynamically assigned to correspond to a port of the servers;

(B) proxifying an object reference referring to a target server of the servers which is to be accessed by a user request by replacing the IP address and the port number of the target server in the object reference with a dynamically assigned gateway port and the IP address of the first gateway;

mapping the dynamically assigned gateway port and the IP address of the first gateway to a dynamically assigned gateway port and the IP address of the second gateway;

mapping the dynamically assigned gateway port and the IP address of the second gateway to the port number of and IP address of the target server;

sending the proxified object reference back to the user device from the first gateway such that the user device uses it to issue the user request to access the target server via the gateways in order to allow secure connection between the user device and the target server to be established without requiring the user request to expose the IP address and port of the target server at the gateways; and (C) establishing the secure connection between the user device and the target server via the first and second gateways.

7. The method of claim 6, wherein (B) is performed by a proxification object program in the first and second gateways.

8. The method of claim 6, wherein (B) further comprises caching, in the first gateway, the mapping of (1) the dynamically assigned gateway port and the IP address of the first gateway and (2) the dynamically assigned port and the IP address of the second gateway port.

9. The method of claim 8, wherein (B) further comprises caching, in the second gateway, the mapping of (1) the dynamically assigned gateway port and the IP address of the second gateway and (2) the port number and IP address of the target server.

10. The method of claim 9, wherein (B) further comprises:

establishing a chain of TCP/IP connections between the user device and the gateways and between the gateways and the target server; and establishing a single SSL (Secure Socket Layer) connection between the user device and the target server.

11. The method of claim 6, wherein said user device comprises a computer system.

* * * * *